United States Patent [19]

Preiss et al.

[11] Patent Number: 5,230,948

[45] Date of Patent: Jul. 27, 1993

[54] METAL-FREE BARRIER-LAYER FILMS

[75] Inventors: Holger Preiss, Visselhövede; Richarda Bochow, Fallingbostel; Klaus Lund, Walsrode, all of Fed. Rep. of Germany

[73] Assignee: Wolff Walsrode Aktiengesellschaft, Walsrode, Fed. Rep. of Germany

[21] Appl. No.: 886,639

[22] Filed: May 20, 1992

[30] Foreign Application Priority Data

Jun. 1, 1991 [DE] Fed. Rep. of Germany ....... 4118048

[51] Int. Cl.⁵ ................................................ B32B 7/02
[52] U.S. Cl. ................................... 428/213; 428/36.7; 428/349; 428/483; 428/516; 428/520
[58] Field of Search ..................... 428/35.4, 516, 500, 428/213, 36.7, 349, 483, 520

[56] References Cited

U.S. PATENT DOCUMENTS

| | | | |
|---|---|---|---|
| 4,421,823 | 12/1983 | Theisen et al. | 428/349 |
| 4,654,240 | 3/1987 | Johnston | 428/35.4 |
| 4,788,105 | 11/1988 | Mueller et al. | 428/520 |
| 5,045,369 | 9/1991 | Kobayashi et al. | 428/36.7 |
| 5,073,419 | 12/1991 | Kansupada et al. | 428/35.4 |
| 5,175,036 | 12/1992 | Smiley et al. | 428/483 |

FOREIGN PATENT DOCUMENTS 0322365 6/1989 European Pat. Off. .
0341044 11/1989 European Pat. Off. .

*Primary Examiner*—Edith Buffalow
*Attorney, Agent, or Firm*—Sprung Horn Kramer & Woods

[57] ABSTRACT

The invention relates to composite films having a particularly good barrier effect against gases and water vapor without a metal layer, for example of aluminum, having to be present.

7 Claims, No Drawings

METAL-FREE BARRIER-LAYER FILMS

This invention relates to composite films having a particularly good barrier effect against gases and water vapor without a metal layer, for example of aluminum or a chlorine containing coating having to be present.

It is known that particularly sensitive products, for example products which are affected by oxygen or which become unuseable though absorption of moisture, can be packed either in vacuo or in an inert gas. To maintain the vacuum or the inert gas in the pack for prolonged periods, the pack has to be correspondingly gas-tight. It is already known that composite films containing a metal layer, for example of aluminum, can be used as packaging materials. However, metal-containing films conceal the packed product from view, are liable to break on folding and are highly conductive due to the presence of a metal layer. In addition, they can be vulnerable to corrosion.

Metal-free composite films comprising barrier layers are also known (see EP-A-0 062 815 and 0 208 075). However, known metal-free composite films are not yet comparable in all their properties with metal-containing composite films, particularly in regard to the duration of the barrier effect.

The problem addressed by the present invention was to provide an improved composite film which is comparable in its properties with a composite film containing a metal layer without having any of its disadvantages.

The present invention relates to a metal-free multilayer film containing a barrier layer with improved barrier behavior against gas and water vapor, characterized in that it essentially comprises the following layers:
A) an optionally stretched polyester layer or a stretched polyester layer suitable for thermoforming,
B1) optionally a coupling or adhesive layer,
C1) a polyolefin layer,
D1) a polyvinyl alcohol layer optionally uncoated or coated with a protective lacquer,
B3) optionally a coupling or adhesive layer,
C2) a polyolefin layer,
B4) optionally a coupling or adhesive layer,
D2) a polyvinyl alcohol layer optionally uncoated or coated with a protective lacquer,
B5) optionally a coupling or adhesive layer,
C3) a polyolefin layer.

The polyvinyl alcohol layer D) preferably consists of an ethylene/vinyl acetate copolymer which in turn consists of 40 to 85 mol-% and, more particularly, 60 to 75 mol-% vinyl acetate units of which at least 90% and preferably more than 95 mol-% are hydrolyzed. A particularly preferred polyvinyl alcohol layer consists of more than 95 mol-% hydrolyzed polyvinyl acetate units. The film produced thereof is biaxially stretched.

In one preferred embodiment, the polyvinyl alcohol layer D) is preferably uncoated.

In one preferred embodiment, the optionally uncoated polyvinyl alcohol layer D) is coupled with the following layers by a coupling or adhesive layer B). A commercially available two-component polyurethane adhesive in particular is used for one adhesive layer.

However, the layers B) may also be a coupling layer of a polyolefin.

The olefin layers C) consist essentially of an olefin. Particularly preferred polyolefins are polypropylenes and polyethylene homopolymers,
EBA (=ethylene butyl acrylate),
EAA (=ethylene acrylic acid),
EEA (=ethylene ethyl acetate) and
ionomer resins, more particularly of an ethylene/methacrylic acid copolymer (=EMA), of which the chain molecules are crosslinked by ionic bonding, more particularly by zinc ions.

Layer A) is formed in particular by a biaxially stretched polyester or by a stretched, thermoformable polyester.

An LLDPE (=linear low-density polyethylene) is particularly preferred as the polyethylene. The individual layers preferably have the following thicknesses in μm:
layer A): 10 to 20 μm,
B1): 0.1 to 10 μm where an adhesive is used,
C1): 5 to 500 μm,
B2): 0.2 to 10 μm where an adhesive is used or 5 to 500 μm where a polyolefin is used for coupling,
layer D1): 1 to 50 μm,
layers E): 5 to 100 μm,
layer B3): 0.2 to 10 μm where an adhesive is used,
layer C2): 5 to 500 μm.

In one preferred embodiment, at least one layer of the composite film is stretched. In a particularly preferred embodiment, layer A) is biaxially stretched.

The constituent layers of the composite film may be treated with typical additives and auxiliaries, such as for example lubricants, antiblocking agents and antistatic agents, in the usual quantities. Preferred additives are saturated or unsaturated fatty acid amides.

| Outside | Thickness [μ] | Film |
|---|---|---|
| A.) PETP | 10–20 | Polyester, biaxially stretched |
|  |  | Polyester, biaxially stretched, thermoformable |
| B.) Adhesive or | 0.2–10 | Commercially available 2-component PU adhesive |
| polyolefin | 5–500 | as coupling layer |
| C.) Polyolefin | 5–500 | PE, CoPE, PP, CoPP, EBA, EAA, EEA, ionomer, EMA |
| B.) Adhesive without polyolefin | 0.2–10 5–500 | As coupling layer |
| D.) PVAL | 10–20 | Polyvinyl alcohol with or without protective lacquer |
| B.) Adhesive or polyolefin | 0.2–10 5–500 | As coupling layer |
| C.) Polyolefin | 5–500 | PE, CoPe, PP, CoPP, EBA, EAA, EEA, ionomer, EMA |
| B.) Adhesive or polyolefin | 0.2–10 5–500 | As coupling layer |
| D.) PVAL | 10–20 | Polyvinyl alcohol with or without protective lacquer |
| B.) Adhesive or polyolefin | 0.2–10 5–500 | As coupling layer |
| E.) Polyolefin | 5–500 | PE, CoPe, PP, CoPP, EBA, EAA, EEA, ionomer, EMA |
| Inside |  |  |

Contrary to the expectation that the barrier effect against gases and water vapor would be determined solely by the film having the lowest gas permeability, it has surprisingly been found that, by virtue of the particular construction, gas permeability is reduced so considerably that a bag made of the composite film according to the invention holds a vacuum, for example, for a very long period of time (approx 10 years).

This particular effect is obtained by the fact that the polyvinyl alcohol layers, which become more permeable to gases with increasing moisture content, are kept dry by layers relatively impermeable to water (for example polyolefins).

In addition, a concentration gradient for both types of gas is achieved by the special sequence of layers impermeable to water vapor and to gases.

In addition, the special sequence of barrier layers for water vapor and gases enables the composite film according to the invention to be provided with a concentration gradient for these groups of substances which steadily decreases from outside inwards.

A film produced in this way may be used for any applications hitherto requiring metal-containing composites to reduce permeability either to gases or to water vapor and, nevertheless, to minimize vulnerability to breakage on folding.

In addition, the product remains clearly visible in the pack.

The film according to the invention may be produced by methods known to the expert, for example even by complete or partial co-extrusion.

The films according to the invention may be used, for example, in the hop industry for packaging hop pellets in an inert gas (for example $CO_2$) to preserve the ferments and enzymes. The films according to the invention may also be used for industrial applications where high vacuums have to be maintained for long periods.

The invention is illustrated by the following Examples:

EXAMPLE 1

A film according to the invention was produced from the following layers:
A) a PETP film, stretched, 12 μm
B1) a coupling or adhesive layer, 2 μm
C1) a polyolefin layer, 120 μm
B2) a coupling or adhesive layer, 2 μm
D1) a polyvinyl alcohol layer coated with a protective lacquer, 15 μm
B3) a coupling or adhesive layer, 2 μm
C2) a polyolefin layer, 120 μm
B4) a coupling or adhesive layer, 2 μm
D2) a polyvinyl alcohol layer coated with a protective lacquer, 15 μm
B5) a coupling or adhesive layer, 2 μm
E1) a polyolefin layer, 50 μm

EXAMPLE 2

A) a PETP film, stretched, 12 μm
B1) a coupling or adhesive layer, 2 μm
C1) a polyolefin layer, 120 μm
B2) a coupling or adhesive layer, 2 μm
D1) a polyvinyl alcohol layer coated with a protective lacquer, 15 μm
B3) a coupling or adhesive, 2 μm
C2) a polyolefin layer, 120 μm
B4) a coupling or adhesive layer, 2 μm
D2) a polyvinyl alcohol layer coated with a protective lacquer, 15 μm
B5) a coupling or adhesive layer, 2 μm
E1) a polyolefin layer, 50 μm

EXAMPLE 3

A film according to the invention was produced from the following layers:

A) a PeTP film, stretched, 12 μm
B1) a coupling or adhesive layer, 2 μm
C1) a polyolefin layer, 120 μm
B2) a coupling or adhesive layer, 2μm
D1) a polyvinyl alcohol layer, 12 μm
B3) a coupling or adhesive layer, 2 μm
c2) a polyolefin layer, 120 μm
B4) a coupling or adhesive layer, 2μm
D2) a polyvinyl alcohol layer, 12 1 μm
B5) a coupling or adhesive layer, 2∞m
E1) a polyolefin layer, 50 μm The individual sealing layers correspond to those of Example 1, except that layer B3) consists of a low-density polyethylene for extrusion lamination.

The tests to determine permeability to water vapor have shown that the permeability to water vapor is approximately 50% lower than inconventional films.

We claim:

1. A metal-free multilayer film containing a barrier layer with improved barrier behavior against gas and water vapor comprising the following layers:
   A) an optionally stretched polyester layer or a stretched polyester layer suitable for thermoforming,
   B1) optionally a coupling or adhesive layer,
   C1) a polyolefin layer,
   B2) optionally a coupling or adhesive layer,
   D1) a polyvinyl alcohol layer optionally coated with a protective lacquer,
   B3) optionally a coupling or adhesive layer, layer,
   C2) a polyolefin layer,
   B4) optionally a coupling or adhesive layer,
   D2) a polyvinyl alcohol layer optionally coated with a protective lacquer,
   B5) optionally a coupling or adhesive layer,
   C3) a polyolefin layer.

2. A multilayer film according to claim 1 wherein the polyvinyl alcohol layers consists essentially of an ethylene/vinyl acetate copolymer that comprises 40 to 85 mol-% of vinyl acetate units of which at least 90 mol-% are hydrolyzed.

3. A multilayer film according to claim 2 wherein at least 95 mol-5 of the vinyl acetate units are hydrolyzed.

4. A multilayer film according to claim 2 wherein the polyvinyl alcohol layers consist essentially of an ethylene/vinyl acetate copolymer that comprises 60 to 75 mol-5 of vinyl acetate units.

5. A multilayer film according to claim 1 wherein the polyvinyl alcohol layers consist essentially of an ethylene/vinyl acetate copolymer that comprises 60 to 75 mol-% of vinyl acetate units of which at least 95 mol-5 are hydrolyzed.

6. A multilayer film according to claim 1 wherein the layers have the following thicknesses in μm:
   A) 10 to 20 μm,
   B1) 0.1 to 10 μm, where an adhesive is used,
   C1) 5 to 500 μm,
   B2) 0.2 to 10 μm where an adhesive is used or 5 to 500 μm where a polyolefin is used for coupling,
   D1) 1 to 50 μm,
   E) 5 to 100 μm,
   B3) 0.2 to 10 μm where an adhesive is used,
   C2) 5 to 500 μm.

7. A multilayer film according to claim 1 wherein the polyolefin layers consist essentially of polypropylene or polyehtylene homopolymers.

* * * * *

UNITED STATES PATENT AND TRADEMARK OFFICE
CERTIFICATE OF CORRECTION

PATENT NO. : 5,230,948
DATED : July 27, 1993
INVENTOR(S) : Preiss, et al.

It is certified that error appears in the above-identified patent and that said Letters Patent is hereby corrected as shown below:

Col. 4, line 30    Delete " layer " (second occurrence)

Col. 4, line 43    After " mol- " delete " 5 " and substitute -- % --

Col. 4, line 47    After " mol- " delete " 5 " and substitute -- % --

Col. 4, line 52    After " mol- " delete " 5 " and substitute -- % --

Signed and Sealed this

Twenty-ninth Day of November, 1994

Attest:

BRUCE LEHMAN

*Attesting Officer*    *Commissioner of Patents and Trademarks*